(12) United States Patent
Krohlow et al.

(10) Patent No.: US 6,712,571 B2
(45) Date of Patent: Mar. 30, 2004

(54) RELEASABLE FASTENING DEVICE FOR MOUNTING COMPONENTS

(75) Inventors: Matthias Krohlow, Ludwigsburg (DE); Mathias Mikl, Leoben (AT); Mario Rieger, Freiberg (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/984,332

(22) Filed: Oct. 29, 2001

(65) Prior Publication Data

US 2002/0057953 A1 May 16, 2002

Related U.S. Application Data

(63) Continuation of application No. PCT/EP00/03149, filed on Apr. 8, 2000.

(30) Foreign Application Priority Data

Apr. 27, 1999 (DE) .................................... 299 07 428 U

(51) Int. Cl.[7] ................................................ F16B 13/04
(52) U.S. Cl. .......................... 411/45; 411/41; 411/508; 248/634; 403/242
(58) Field of Search ................................. 411/41, 45–48, 411/55, 508, 542; 248/560, 609, 634; 403/242, 243, 244

(56) References Cited

U.S. PATENT DOCUMENTS

| | | | | |
|---|---|---|---|---|
| 3,065,342 | A | * | 11/1962 | Worden |
| 3,200,694 | A | * | 8/1965 | Rapata |
| 3,910,588 | A | * | 10/1975 | Austin |
| 4,263,833 | A | * | 4/1981 | Loudin |
| RE33,809 | E | * | 1/1992 | Okada |
| 5,540,528 | A | * | 7/1996 | Schmidt |

* cited by examiner

Primary Examiner—Flemming Saether
(74) Attorney, Agent, or Firm—Crowell & Moring LLP

(57) ABSTRACT

A releasable fastening device that includes a rivet (3) that can be inserted in through openings (5, 6) of components (1, 2) that are to be mounted. The rivet (3) is provided with a projection at one end and with spreadable expansion elements (4) at its other end. A threaded bolt (8) is axially pushed into an internal counter-thread of the rivet (3) to spread the expansion elements (4). When the fastening device is assembled, the walls of the components (1, 2) or of an intermediate element (7) engage radial recesses on the circumference of the rivet (3) to hold the components securely. Bolt (8) can be unscrewed from the rivet (3) to facilitate disassembly.

3 Claims, 1 Drawing Sheet

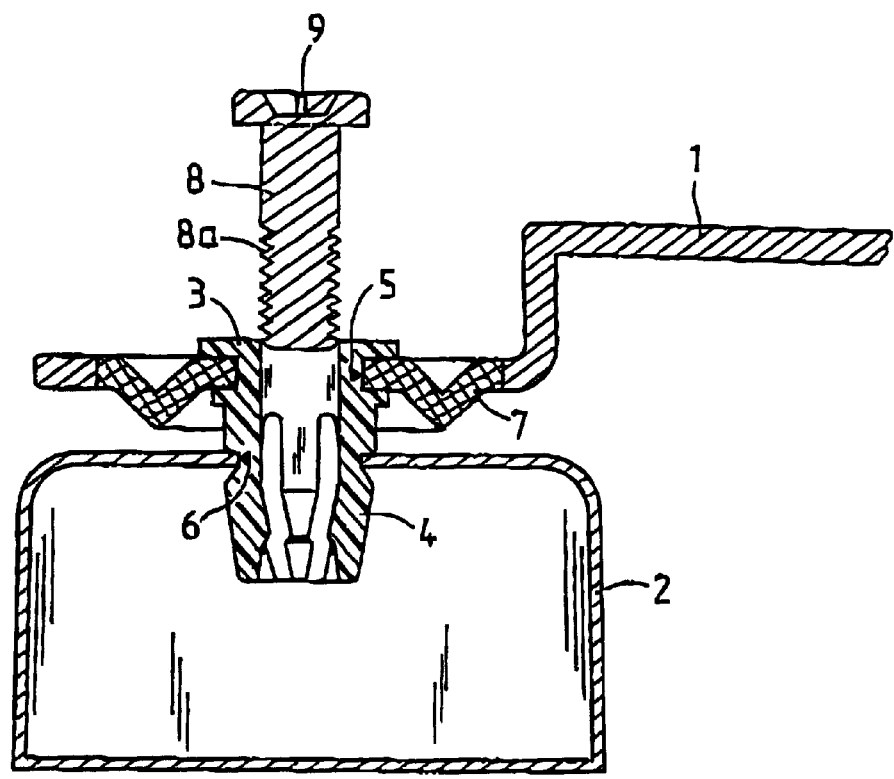

RELEASABLE FASTENING DEVICE FOR MOUNTING COMPONENTS

CROSS REFERENCE TO RELATED APPLICATIONS

This application is a continuation of international patent application no. PCT/EP00/03149, filed Apr. 8, 2000, designating the Unites States of America, the entire disclosure of which is incorporated herein by reference. Priority is claimed based on Federal Republic of Germany patent application no. DE 299 07 428.5, filed Apr. 27, 1999.

BACKGROUND OF THE INVENTION

The invention relates to a releasable fastening device for mounting components, particularly an air filter housing or an intake pipe in the engine compartment of a motor vehicle.

Hoferer et al., U.S. Pat. No. 4,881,292 (=DE 37 40 760) discloses, for instance, a mounting bracket that is fixed to an air filter housing and is provided with a through opening. A detachable, U-shaped, one-piece clip that engages with the through opening is provided with sleeves that are formed onto the inner surface of each leg in the area of the through opening. Each leg is provided with at least one flexible tongue pressing against the mounting bracket.

SUMMARY OF THE INVENTION

It is an object of the invention to further to develop a releasable fastener of the initially defined type, which ensures simple and cost-effective assembly.

Another object of the invention is to provide a releasable fastener which provides a secure hold of the component, even if the housing shapes are complex.

These and other objects of the invention are achieved by providing a releasable fastening device for attaching components through aligned openings, a spreadable expansion rivet inserted through the openings, the rivet having at one end thereof a projection extending radially beyond the openings and at the other end thereof a plurality of spreadable expansion elements which in their expanded state reach under the openings, a threaded bolt which can be inserted by axial pressure into a corresponding counter thread in the interior of the rivet and which can be unscrewed from the counter thread for disassembly, the bolt when inserted in the rivet causing the spreadable expansion elements to expand, the rivet having radial recesses on its circumference in which walls of the components or intermediate elements engage once the fastening device has been expanded, wherein the rivet is interlockingly inserted into an intermediate decoupling element arranged between the components.

The initially mentioned releasable fastening device for mounting components, particularly an air filter housing or an intake pipe, is advantageously further developed according to the invention in that a so-called expansion rivet can be inserted into the through openings provided on opposite sides of the housing parts or other component parts to be fastened. At one end the rivet fits with a projection extending over the through openings and at its other end is provided with spreadable expansion elements, which in their spread state reach under the through openings and thereby firmly join the component, e.g., an air filter housing, to the vehicle body.

Especially during assembly, a threaded bolt can be pushed under axial pressure into a corresponding counter thread—which in this case is elastically resilient—formed in the interior of the rivet. This permits quick and simple assembly of the mounting device. The threaded bolt can be readily provided with a screw slot to unscrew the threaded bolt by means of a corresponding tool, i.e. a screwdriver, so that the fastening device can be easily released when the component is disassembled or dismounted.

In its inserted state, the threaded bolt causes the expansion elements to spread so that the joined parts are securely held together.

Once the mounting device is assembled, the walls of the component or other intermediate elements engage in radial recesses on the circumference of the rivet. As a result, even a housing with complex housing parts can be securely assembled by means of the fastening device or attached, for instance, to a part of the vehicle body.

Further advantageous embodiments are described hereinafter.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWING

The invention will be described in further detail hereinafter with reference to illustrative preferred embodiments shown in the accompany drawing, which is a sectional view through such a fastening device for mounting a filter housing.

DETAILED DESCRIPTION OF PREFERRED EMBODIMENTS

The drawing FIGURE shows a mounting device for fastening an air filter housing 1 to a body part 2 of a motor vehicle. This mounting device is provided with a rivet 3, which is configured as an expansion rivet and is provided with expansion elements 4 and is inserted into through openings 5 and 6 of the parts to be connected 1 and 2. The wall of an opening in the intermediate decoupling element 7 is expandable to be received in a recess of the rivet 3. Decoupling element 7 is preferably made of a resilient elastic material to damp or inhibit vibrations of the mounted components.

During assembly of the mounting device, a threaded bolt 8, which is provided with an external thread, is inserted into the rivet 3. The threads of the bolt engage with corresponding threads in the interior of the rivet 3. Since the material of the rivet 3 yields elastically as the threaded bolt 8 is pushed in axially, the bolt does not need to be screwed into the rivet.

In the inserted state, the expansion elements 4 reach under the through opening 6 and thus secure the mounting element. To dismount the mounting device, the threaded bolt 8 can be unscrewed by means of a suitable tool, such as a screwdriver, that can engage with a screw slot 9 provided on the threaded bolt 8. This causes the expansion elements 4 to loose their expansion effect and thus permits disassembly or dismounting of the mounted component.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A releasable fastening device for attaching at least first and second components that each have an opening, the fastening device comprising a spreadable expansion rivet insertable through the openings, the rivet including at least first and second recesses and an interior thread, wherein the opening of the first component is disposed within the first recess of the rivet;

a threaded bolt that is insertable into the interior of the rivet to engage with the interior thread of the rivet; and an elastic intermediate decoupling element having a wall that is mounted to the opening of the second component and placed in the second recess of the rivet, wherein when the threaded bolt is inserted into the interior of the rivet to engage the interior thread of the rivet, the bolt causes the spreadable expansion rivet to expand so that the opening of the first component and the first recess of the rivet interlock and that the wall of an opening in the intermediate decoupling element is expandable to be received in the second recess of the rivet, wherein the threaded bolt can be unscrewed from the interior thread of the rivet for disassembly.

2. The releasable fastener according to claim 1, wherein the threaded bolt includes a screw slot, by which slot the threaded bolt can be unscrewed by way of a screwdriver.

3. The releasable fastening device according to claim 1, wherein the intermediate decoupling element includes a circumferential pleat to increase the radial and axial elasticity of the intermediate decoupling element.

* * * * *